(No Model.)
A. F. SHULER.
JUMP SEAT IRON.
No. 334,905. Patented Jan. 26, 1886.
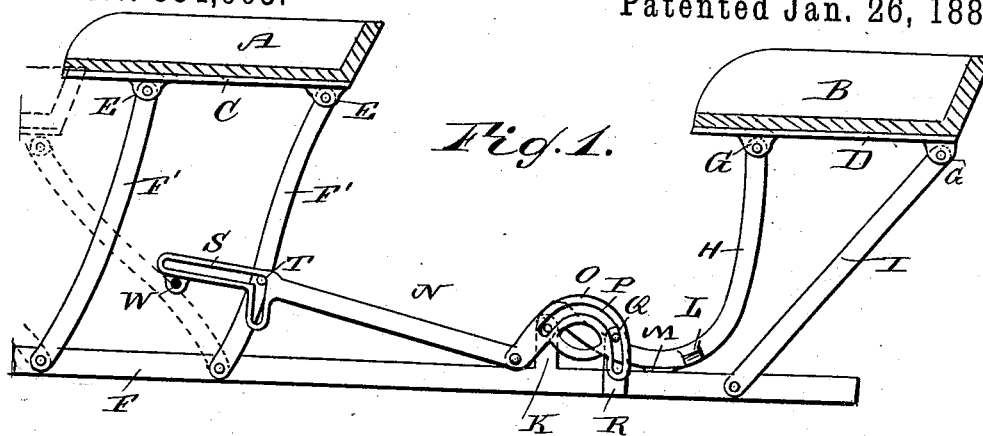
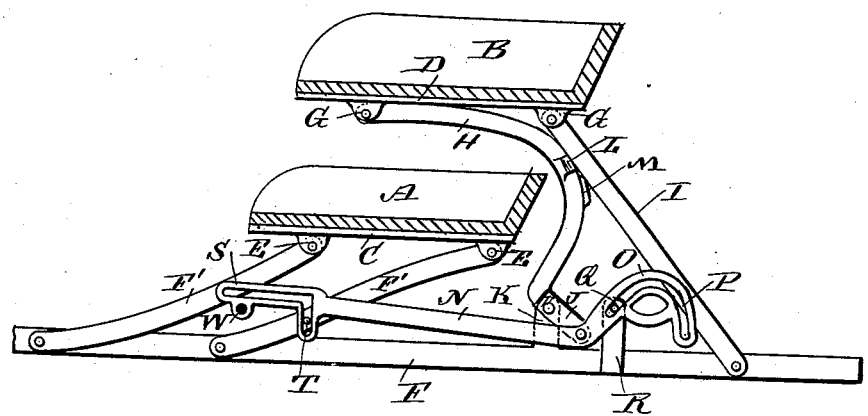
WITNESSES:
Theo. G. Hoster
C. Sedgwick
INVENTOR:
A. F. Shuler
BY Munn & Co
ATTORNEYS.

UNITED STATES PATENT OFFICE.

ANDREW F. SHULER, OF ARCANUM, OHIO.

JUMP-SEAT IRON.

SPECIFICATION forming part of Letters Patent No. 334,905, dated January 26, 1886.

Application filed September 8, 1885. Serial No. 176,486. (No model.)

*To all whom it may concern:*

Be it known that I, ANDREW F. SHULER, of Arcanum, in the county of Darke and State of Ohio, have invented a new and Improved Seat-Iron, of which the following is a full, clear, and exact description.

The object of my invention is to provide a new and improved wagon-seat iron or seat-frame, which is so constructed that the seat can be adjusted to form one or two seats, as may be required or desired.

The invention consists in the construction and combination of parts and details, as will be fully described and set forth hereinafter, and pointed out in the claims.

Reference is to be had to the accompanying drawings, forming a part of this specification, in which similar letters of reference indicate corresponding parts in both the figures.

Figure 1 is a side view of the seat-iron adjusted for two seats. Fig. 2 is a like view of the same, showing it adjusted for one seat.

A is a front seat, and B is a back seat, the former being secured on bars C and the latter on bars D.

On jaws E on the bar C two bars, F', are pivoted, which have their lower ends pivoted on the base-bar F. The bar D has two jaws, G, to which the two bars H and I are pivoted, the lower end of the bar I being pivoted to the base-bar F. The bar H is curved and provided with a bend, J, at its lower end, and is pivoted at said bend to a lug, K, projecting upward from the upper edge of the base-bar F. The curved bar H is provided near its lower end with a laterally-projecting stop-lug, L, and with a downwardly-projecting stop-lug, M. The lower end of the bar H is pivoted to a bar, N, having a bend, O, at which bend the bar H is pivoted.

In the bend O a curved slot, P, is formed, through which a pin, Q, passes from a lug, R, projecting upward from the base-bar F. In the other end of the bar N an L-shaped slot, S, is formed, into which a pin, T, passes from the rear bar, F', of the front seat. A handle-rod, W, is formed on the end of the said bar N at the slot S.

The operation is as follows: When only one seat is required, the seat B is held above the seat A, as shown in Fig. 2. When two seats are to be used, the seat B is swung to the rear, whereby the seat A is swung to the front, as shown in Fig. 1, both seats being held securely. When a person wishes to enter the vehicle, and for that purpose more room is required between the seats, bar N is raised at its free end to bring the pin T into the longitudinal shank of the slot S, and then the front seat, A, can be swung to the front, as shown in dotted lines in Fig. 1. When the front seat, A, is raised or swung back, the pin T is in the short shank of the slot S, and thus prevents the seat from taking other positions, except when desired.

My improved seat-iron can be used in any vehicle and with any kind of seat, a seat-iron constructed as described above being used at each end of the seats.

Having thus fully described my invention, I claim as new and desire to secure by Letters Patent—

1. The combination, with the front and two rear bars pivoted to the base-bar, the front bar of the rear pair having a pin at its lower end beyond its pivot, of the bar N, pivoted to the lower end of the front bar of the rear pair, and provided beyond the pivot with a curved slot, into which a pin on a lug on the base-bar projects, the front end of the bar N being connected with the rear bar of the front pair, substantially as herein shown and described.

2. The combination, with two front bars and two rear bars pivoted to a base-bar, the front bar of the rear pair having a pivot beyond its joint-pivot, and at its lower end, of the bar N, having a curved slot at one end and an L-shaped slot at the other end, a pin projecting from a lug on the base into the curved slot of the bar N, and a pin projecting from the rear bar of the front pair into the front L-shaped slot of the bar N, substantially as herein shown and described.

3. The combination, with the bars F' F' and the bars H I, pivoted on the bar F, the bar H having the bend J, at which it is pivoted to the base, of the bar N, having the bend O and the curved slot P, and pivoted in front of the bend to the lower end of the bar H, and which bar N is provided at its front end with an L-shaped slot, S, the pin Q, passed from a lug on the base into the slot P, and the pin T, passed from the rear leg, F', of the front pair into the front L-shaped slot, S, in the bar N, substantially as herein shown and described.

ANDREW F. SHULER.

Witnesses:
F. M. NORTH,
C. C. ADELSPERGER.